US012789413B2

(12) United States Patent
Achten et al.

(10) Patent No.: US 12,789,413 B2
(45) Date of Patent: Nov. 10, 2026

(54) METHOD OF MANUFACTURING A PARTICULATE COMPOSITION

(71) Applicant: Covestro Deutschland AG, Leverkusen (DE)

(72) Inventors: Dirk Achten, Leverkusen (DE); Ann-Christin Bijlard-Jung, Rösrath (DE); Joerg Tillack, Solingen (DE); Fabian Schuster, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 36 days.

(21) Appl. No.: 18/877,225

(22) PCT Filed: Jun. 16, 2023

(86) PCT No.: PCT/EP2023/066197
§ 371 (c)(1),
(2) Date: Dec. 19, 2024

(87) PCT Pub. No.: WO2023/247337
PCT Pub. Date: Dec. 28, 2023

(65) Prior Publication Data

US 2025/0381708 A1 Dec. 18, 2025

(30) Foreign Application Priority Data

Jun. 23, 2022 (EP) .................................... 22180588
Aug. 3, 2022 (EP) .................................... 22188535

(51) Int. Cl.
*B29B 9/12* (2006.01)
*B29B 9/16* (2006.01)
*B33Y 70/00* (2020.01)

(52) U.S. Cl.
CPC .................. *B29B 9/12* (2013.01); *B29B 9/16* (2013.01); *B29B 2009/125* (2013.01); *B29K 2995/0041* (2013.01); *B33Y 70/00* (2014.12)

(58) Field of Classification Search
None
See application file for complete search history.

(56) References Cited

U.S. PATENT DOCUMENTS 4,888,124 A * 12/1989 Blum .................... C07C 265/12 528/68
2008/0171208 A1 7/2008 Buchner et al.
2019/0184632 A1* 6/2019 Achten ................. B29C 64/165
2021/0245424 A1* 8/2021 Achten .................. B29C 64/30

FOREIGN PATENT DOCUMENTS

WO WO-2018046739 A1 * 3/2018 ........... B29C 64/188
WO WO-2020016115 A1 * 1/2020 ............. C08G 18/73
WO 2020085912 A1 4/2020
WO 2021233749 A1 11/2021
WO 2021233750 A1 11/2021

OTHER PUBLICATIONS

Dispercoll U XP 2682 datasheet (Year: 2011).*

* cited by examiner

*Primary Examiner* — Katarzyna I Kolb
(74) *Attorney, Agent, or Firm* — The Webb Law Firm

(57) ABSTRACT

A method of manufacturing a particulate composition includes providing an aqueous dispersion, the dispersion including polymer particles, where the polymer of the particles has a glass transition temperature as determined by differential scanning calorimetry according to ISO 11357, second heating, at a heating and cooling rate of 20 K/min; and storing the dispersion of step I) at a temperature of ≤0° C. until a polymer including precipitate is formed. The method further includes grinding the precipitate at a temperature above the glass transition temperature of the polymer to obtain a particulate composition, where the precipitate subject to grinding has a water content of at least 5 wt.-%.

15 Claims, 2 Drawing Sheets

METHOD OF MANUFACTURING A PARTICULATE COMPOSITION

CROSS-REFERENCE TO RELATED APPLICATIONS

This application is the United States national phase of International Patent Application No. PCT/EP2023/066197 filed Jun. 16, 2023, and claims priority to European Patent Application No. 22180588.0 filed Jun. 23, 2022, and European Patent Application No. 22188535.3 filed Aug. 3, 2022, the disclosures of which are hereby incorporated by reference in their entireties.

BACKGROUND

Technical Field

The present invention relates to a method of manufacturing a particulate composition comprising: I) providing an aqueous dispersion, the dispersion comprising polymer particles, wherein the polymer of the particles has a glass transition temperature as determined by differential scanning calorimetry according to ISO 11357, second heating, at a heating and cooling rate of 20 K/min; and II) Storing the dispersion of step I) at a temperature of ≤0° C. until a polymer-comprising precipitate is formed.

The invention also relates to a particulate composition which is obtainable by the method and the use of the particulate composition as a build material in additive manufacturing processes, as a coating or an adhesive.

Description of Related Art

The processing of polymers with defined particle sizes is a central requirement for many different applications and industries. Fine polymer powders are used in powder scattering applications or sintering processes. Industries that make use of these materials include the textile and shoe industry, automotive industry as well as the medical and cosmetic industries. The size requirements for polymer particles used in the above-mentioned applications are commonly in the sub-mm range.

The state-of-the-art for the milling of solid or liquid materials is broad containing different milling systems many using rotor/stator principle such as a toothed colloid mill. These are often used to process high viscos materials or emulsions.

Materials can be milled/ground either in their dry or wet state, depending on their properties. Wet grinding in comparison to dry grinding comes with the advantage that the material transport and dosing is easier and no dust has been generated while processing the material. However, these processes employ a significant amount of solvent/water which may evaporate, and careful monitoring is needed in case solvents are being used.

Especially for milling of thermoplastic polyurethanes (TPUs), cryogenic milling/grinding is the method of choice. In this technique, the materials are cooled below their glass transition temperature to ensure they are in their glassy state. Since TPUs are often soft and tough at room temperature and heat up with energy input during grinding, they tend to agglomerate or adhere to the vessels and rotors. This is undesirable. Commonly, cooling agents such as liquid $CO_2$ or $N_2$ in amounts of up to 10 kg per 1 kg of milled polymer are used. This makes cryogenic milling/grinding an energy intensive, costly and complex process.

In WO 2020/085912 A1 a process for preparing thermoplastic polymers is disclosed wherein the examples disclose polymer particles which are obtained e.g. by cryogenic milling. Prior to the milling the thermoplastic polymers in WO 2020/085912 A1 are dried at high temperatures and in most cases under vacuum.

In US 2008/171208 A1 it is disclosed that a dispersion "2" (comparison) and a dispersion "4" (according to the invention in US 2008/171208 A1) were stored in a freezer for 24 hours at −5° C. and that the polymer precipitated in the form of coarse solid particles. The formulation was heated to room temperature and the precipitated polymer was separated from the serum by filtration. The polymer was then dried and ground in a jet mill with cooling.

It should be noted that in WO 2020/085912 A1 and US 2008/171208 A the polymer particles were dried prior to the grinding.

WO 2021/233749 A1 relates to a method of manufacturing a solids-incorporating polymer comprising the steps of: I) providing an aqueous polymer dispersion, the dispersion comprising crystallizing polyurethane particles having a mean particle size of ≤500 nm and further comprising inorganic particles; II) storing the dispersion of step I) at a temperature of ≤0° C. until a precipitate is formed; III) Isolating the precipitate of step II) and IV) removing water from the isolated precipitate of step III), thereby obtaining a water-depleted precipitate. The disclosure also relates to a solid particulate composition which is obtainable by the method and the use of the composition as a build material in additive manufacturing processes, as a coating, an adhesive or as a rubber.

WO 2021/233750 A1 discloses a method of manufacturing a solids-incorporating polymer comprising the steps of: I) providing an aqueous polymer dispersion, the dispersion comprising crystallizing polyurethane particles having a particle size of ≤500 nm; and further comprising organic colorant particles; II) storing the dispersion of step I) at a temperature of ≤0° C. until a precipitate is formed; III) Isolating the precipitate of step II) and IV) removing water from the isolated precipitate of step III), thereby obtaining a water-depleted precipitate. The disclosure also relates to a solid particulate composition which is obtainable by the method and the use of the composition as a build material in additive manufacturing processes, as a coating or an adhesive.

SUMMARY

The present invention has the objective of providing a method of manufacturing a particulate composition with an increased efficiency in grinding by a low energy milling process. The increased efficiency may in particular be measured by the percentage of particles having a size of less than 1.00 mm, preferably less than 0.50 mm, more preferably less than 0.25 mm. This objective has been achieved by a method according to claim 1. The invention also provides for a particulate composition according to claim 12 and a use of the particulate composition according to claim 15. Advantageous embodiments are disclosed in the dependent claims. They may be combined freely unless the context clearly indicates otherwise.

Accordingly, a method of manufacturing a particulate composition comprises:

I) Providing an aqueous dispersion, the dispersion comprising polymer particles, wherein the polymer of the particles has a glass transition temperature as determined by differential scanning calorimetry according to ISO 11357, second heating, at a heating and cooling rate of 20 K/min and II) Storing the dispersion of step I) at a temperature of ≤0° C. until a polymer-comprising precipitate is formed.

The method further comprises:

III) Grinding the precipitate of step II) at a temperature above the glass transition temperature of the polymer to obtain a particulate composition, wherein the precipitate subject to grinding has a water content of at least 5 wt.-%.

It has surprisingly been found that the particulate composition obtained by the method according to the invention has a high percentage of particles having a size of less than 1.00 mm. The advantage of the given inventive process is that particulate compositions with particle sizes of less than 1.00 mm can be achieved with very little mechanical energy input even at temperatures above the glass transition temperature of the polymer particles, that are otherwise only available from energy and cost intensive processes like cryogenic milling. Another advantage of the given inventive process is that the process provides particles with a rounder primary particle shape, opposed to particles from cryogrinding processes that provide materials with largely fractal, rugged surfaces.

The aqueous dispersion comprising polymer particles which is provided in step I) may be based on a commercially available polymer dispersion. The polymer particles dispersed within the aqueous phase may have an intensity-based harmonic mean particle size of the hydrodynamic diameter (Z-Average), as determined by dynamic light scattering, of ≤1000 nm or ≤500 nm. Preferred mean particle sizes are ≥10 nm to ≤500 nm, ≥10 nm to ≤350 nm, more preferred ≥20 nm to ≤350 nm and ≥20 nm to ≤250 nm. The dispersion may also contain customary adjuvants such as emulsifiers. Furthermore, the dispersion may have acids, bases or a buffer system to set the pH value to a desired level. Preferred are pH values of 4 to 10. Lastly, water soluble electrolytes such as metal halogenides, oxides or carbonates may be added to influence electrostatic properties such as the zeta potential of the polymer particles.

The polymer of the particles has a glass transition temperature (hereinafter also referred to as "Tg") as determined by differential scanning calorimetry according to ISO 11357, second heating, at a heating and cooling rate of 20 K/min. It is preferred that the polymer of the particles has a Tg of −70° C. to 20° C., more preferably −70° C. to 0° C., in particular −70° C. to −20° C. and most preferred −70° C. to −30° C.

In step II) of the method the polymer containing dispersion is stored at a temperature of 0° C. or less, preferably −5° C. or less, more preferably −10° C. or less, most preferably above the Tg of the polymer particles, until a polymer-comprising precipitate is formed. This precipitate contains agglomerates of the polymer particles. In a simple but efficient manner, step II) can be conducted by storing drums or other common commercial transport vessels like IBC (Intermediate Bulk Container), Bigbags etc. of polymer dispersion in a walk-in freezer or a commercial cold storage facility. Preferably the vessels can be transported using common transport pallets like Europallets.

Optionally it is possible to add alkali or alkaline earth-based water soluble ions or to add acids or bases to the aqueous dispersion in order to promote the formation of the precipitate.

The medium particle size by weight distribution of the particulate composition may be ≤1 mm, more preferably ≤0.8 mm and in particular ≤0.5 mm.

In step III) the precipitate of step II) is ground at a temperature above the glass transition temperature of the polymer to obtain a particulate composition. The content of water in the precipitate subject to grinding is at least 5 wt.-%, based on the total weight of the precipitate.

The grinding can be carried out by various suitable machines, for example with ball mills, powder mills or hammer mills. It is preferred that the grinding is conducted by internal grinding of the polymeric particles in the precipitate against themselves with the stirring and grinding equipment merely facilitating this internal grinding of the polymeric particles. In this respect, besides high-powered grinding equipment that efficiently reduces the particle size in <5 min preferred <2 min and more preferred <1 min to the desired values, the use of simple, low-powered and slow-stirring with a processing time of up to two days is also feasible.

The energy input into grinding the precipitate may be lower than in conventional processing, for example at least ≤50%, more preferably ≤40%, in particular ≤30% and most preferably ≤20% of the energy input of a standard cryo-grinding operation for tough polymeric materials.

It is preferred that in the particulate composition after step III) the content of particles having a size of less than 1.00 mm, as determined by fractional sieving, is in the range of from 60 wt.-% to 100 wt.-%, based on the total weight of the particles. Preferred is from 70 wt.-% to 100 wt.-%, in particular from 80 wt.-% to 100 wt.-% and most preferred from 85 to 100%. It is further preferred that in the particulate composition after step III) the content of particles having a size of less than 0.50 mm, as determined by fractional sieving, is in the range of from 20 wt.-% to 100 wt.-%, based on the total weight of the particles. Preferred is from 40 wt.-% to 100 wt.-%, in particular from 60 wt.-% to 100 wt.-% and most preferred from 85 wt.-% to 100 wt.-%.

The particulate composition may be produced in presence of polymer-reactive materials such as blocked or free isocyanate-containing compounds, compounds containing carbodiimides, epoxides, a mines, carboxylic acids or aziridines. Preferably the reactive compounds are introduced as a liquid or solid or particulate solid and stirred for some time with the polymer dispersion of step I) to achieve a homogeneous distribution before the dispersion of polymer is stored at a temperature <0° C. in step II). In a preferred aspect the reactive compounds contain free isocyanates with a melting point of >30° C. Preferably the free isocyanate-containing compounds comprise aliphatic isocyanates, preferably PDI, HDI or IPDI. Preferably the free isocyanate-containing compounds are a particulate solid before stirring into the polymer dispersion.

In a variant, which can be combined freely with other embodiments described herein unless the context clearly indicates otherwise, the method according to the invention for manufacturing a particulate composition consists of:

I) Providing an aqueous dispersion, the dispersion comprising polymer particles, wherein the polymer of the particles has a glass transition temperature as determined by differential scanning calorimetry according to ISO 11357, second heating, at a heating and cooling rate of 20 K/min, II) Storing the dispersion of step I) at a temperature of ≤0° C. until a polymer-comprising precipitate is formed and III) Grinding the precipitate of step II) at a temperature above the glass transition temperature of the polymer to obtain a particulate composition, wherein the precipitate in step II) has a water content of at least 5 wt.-%.

According to one embodiment the method further comprises concentrating the polymer particles to 70 to 90 wt.-% of the precipitate and proceeding with step III). The concentration may be affected by removing the bulk of the aqueous phase by draining methods to obtain a (wet) precipitate with a residual water content of 10 to 30 wt.-% and 70 to 90 wt.-% of polymer particles, based on the total weight, for further handling. Commonly used processes for separating solids from liquids may be employed. Preferred processes to increase the concentration of the polymer particles in the dispersion are filtration, decanting, dewatering presses, partial drying or a combination thereof. The residual aqueous phase may have a solids content of ≤5.0 weight-%, preferably ≤2.0 weight-%, more preferred ≤1.0 weight-% and most preferred ≤0.5 weight-%.

According to another embodiment the method further comprises: IV) removing water from the particulate composition obtained after step III), thereby obtaining a dried particulate composition. Step IV) is an optional drying step in which the water content of the particulate composition may be further reduced. This can yield a free-flowing powder or granules. Drying may occur by heating, dry air treatment and/or the application of vacuum and by vacuum and/or drying extrusion. The dried particulate composition preferably has a water content of less than 5 wt.-%, based on the total weight of the dried particulate composition.

According to another embodiment the dried particulate composition of step IV) has a water content of ≥0.05 wt.-% to ≤5 wt.-%, based on the total weight of the dried particulate composition. Preferably the water content is >0.05 wt.-% to 2.00 wt.-% and more preferred >0.10 wt.-% to <1.00 wt.-%.

According to another embodiment step III) is carried out at a temperature of ≤0° C. and above the glass transition temperature of the polymer particles. Preferably this grinding in step III) is carried out at a temperature in the range of from −50° C. to 0° C., more preferred from −40° C. to −8° C.

According to another embodiment step III) is carried out at a temperature of >0° C. and above the glass transition temperature of the polymer particles. Preferably this grinding in step III) is carried out at a temperature in the range of from 2° C. to 40° C., more preferably from 5° C. to 25° C.

According to another embodiment, prior to step III) the precipitate does not have a water content of less than 5 wt.-%. This embodiment shall exclude a (partial) drying and re-wetting of the material before it is subjected to grinding.

According to another embodiment the precipitate in step II) has a water content of ≥10 to ≤70 wt.-%. Preferably the water content is in the range from 12 wt.-% to 60 wt.-%, in particular from 15 wt.-% to 60 wt.-% and most preferred from 25 wt.-% to 60 wt.-%.

According to another embodiment the polymer particles comprise thermoplastic polymer particles. Preferably at least 30 wt.-% (more preferred at least 50 wt.-%, even more preferred at least 95 wt.-%) of the polymer particles with respect to the total amount of the polymer particles, are thermoplastic polymer particles.

According to another embodiment the thermoplastic polymer particles are thermoplastic polyurethane particles. Examples for suitable polymeric particles include anionically hydrophilicized polyurethanes, cationically hydrophilicized polyurethanes and nonionically hydrophilicized polyurethanes. Polyurethanes without internal hydrophilicizing groups may be emulsified by adding external emulsifiers to the dispersion. Preferred are nonionic polyethylene glycol-based emulsifiers.

Also suitable are linear polyester polyurethanes produced by reaction of a) polyester diols having a molecular weight above 600 and optionally b) diols in the molecular weight range of 62 to 600 g/mol as chain extenders with c) aliphatic diisocyanates, while observing an equivalent ratio of hydroxyl groups of components a) and b) to isocyanate groups of component c) of 1:0.9 to 1:0.999, wherein component a) consists to an extent of at least 80% by weight of polyester diols in the molecular weight range of 1500 to 3000 based on (i) adipic acid and (ii) 1,4-dihydroxybutane and/or neopentyl glycol.

It is further preferred that component c) comprises IPDI and/or HDI and/or H12MDI. It is also preferred that the alkanediols b) are selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these in an amount of up to 200 hydroxyl equivalent percent based on component a).

The polyurethanes may also comprise urea groups and therefore also be regarded as polyurethane/polyurea compounds.

The polyurethanes are preferably of the crystallizing type, i.e. they at least partially crystallize after drying of the dispersion. At least partial crystallinity of the material can be established by the presence of a melting peak in a differential scanning calorimetry (DSC) measurement, second heating, at a heating/cooling rate of 20 K/min. The melting peak of the polyurethane material preferably is at a temperature of 20° C. to 100° C., more preferred 40° C. to 80° C.

In another embodiment of the invention the aqueous dispersion contains a polyurethane with a melting point of <100° C. and a Tg in the range from −70° C. to <0° C. as determined by DSC, second heating, at a heating/cooling rate of 20 K/min.

According to another embodiment the polymer of the polymeric particles in the aqueous dispersion of step I) has a number-average molecular weight Mn, determined by gel permeation chromatography against polystyrene standards with THE as eluent, of ≥10000 g/mol. Preferably Mn is ≥20000 g/mol and in particular ≥30000 g/mol. This is particularly preferred in the case of polyurethane polymers. Polymers with such high molecular weights can usually only be processed into stable dispersions when a low solids content is targeted. This is of no consequence in the method according to the invention as the material is precipitated anyway.

According to another embodiment the aqueous dispersion of step I) has a polymer solids content of ≥10 weight-% to ≤60 weight-%, based on the total weight of the aqueous dispersion. Preferred are polymer particles contents of ≥30 weight-% to ≤55 weight-% in accordance with commercially available polymer dispersions.

A further aspect of the present invention is a particulate composition which is obtained by a method according to the invention. According to one embodiment the content of particles having a size of less than 0.50 mm, as determined by fractional sieving, is in the range of from 20 wt.-% to 100 wt.-%, based on the total weight of the particles. Preferably this range is from 40 wt.-% to 100 wt.-%, in particular from 60 wt.-% to 100 wt.-% and most preferred from 85 wt.-% to 100 wt.-%. In a further embodiment the particulate composition has an average weight distribution particle size of ≤1 mm and is an aliphatic TPU with a melting point of ≤100° C. as determined by DSC, second heating, at a heating/cooling rate of 20 K/min.

A further aspect of the present invention is the use of the particulate composition according to the invention as a coating or as an adhesive.

The particulate composition can also be combined with and used in combination with a powdered crosslinking agent to form reactive powders, where the crosslinking agent is preferably a solid isocyanate, a solid blocked isocyanate, a solid carbodiimide, or a solid aziridine or a solid epoxide.

DETAILED DESCRIPTION

Examples

Figure 1:
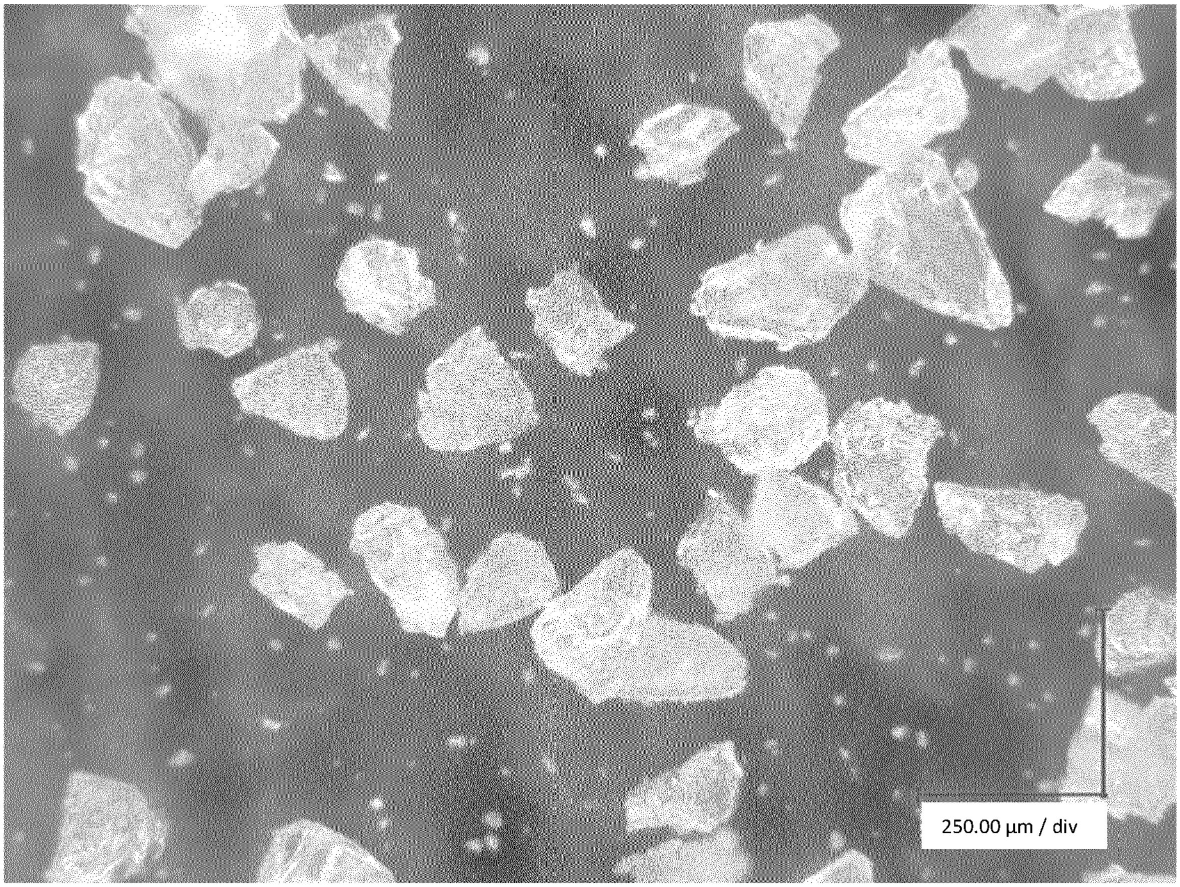
FIG. 1 shows a microscopy image of the cryogenic ground particles according to sample M.

The present invention will be further described with reference to the following examples and figures without wishing to be limited by them.

Materials

Deionized water was used for all experiments.

Polyester Polyurethane Polymers:

Dispersion A was a crystallizing polyester urethane/urea aqueous dispersion for adhesive applications with a pH of 6,9, a glass transition temperature of the polymer (DSC, 20 K/min) of −51° C., a melting temperature of the polymer (DSC, 20 K/min) of 49° C. and a solids content of ca. 50 weight-%.

Starting distribution (example A1) was produced from dispersion A as follows: Freezing of 1 kg of dispersion A in a 1 l plastic container at −18° C. for 48 h and thawing at room temperature for 24 h. Wet fractioning of the received coarse particle slurry of a white polymer crumb in water was then carried out as described below.

Starting distribution (example A2) was produced from dispersion A as follows: 1) Freezing of 1 kg of dispersion A in a 1 l plastic container at −18° C. for 48 h and thawing at room temperature for 24 h. 2) Filtration of the obtained coarse particle slurry of a white polymer crumb in water, thereby obtaining a solid material with a water content of ca. 20 weight-%. Wet fractioning was then carried out as described.

Starting distribution (example A3) was produced from dispersion A as follows: 1) Freezing of 1 kg of dispersion A in a 1 l plastic container at −18° C. for 48 h and thawing at room temperature for 24 h. 2) Filtration of the obtained coarse particle slurry of a white polymer crumb in water, thereby obtaining a solid material with a water content of ca. 20 weight-%. 3) Vacuum drying of the material in a rotary evaporator, thereby obtaining a solid material with a water content of ca. 13 weight %. Wet fractioning was then carried out as described.

Starting distribution (example A4) was produced from dispersion A as follows: 1) Freezing of 1 kg of dispersion A in a 1 l plastic container at −18° C. for 48 h and thawing at room temperature for 24 h. 2) Filtration of the obtained coarse particle slurry of a white polymer crumb in water, thereby obtaining a solid material with a water content of ca. 20 weight-%. 3) Vacuum drying of the material in a rotary evaporator, thereby obtaining a solid material with a water content of ca. 0.5 weight-%. Dry fractioning was then carried out as described.

Inventive example B was produced from dispersion A in a 2-step process: 1) Freezing of 1 kg of dispersion A in a 1 l plastic container at −18° C. for 48 h and thawing at room temperature for 24 h. 2) Grinding of the obtained coarse particle slurry of a white polymer crumb in water using a GEFU 89210 Flotte Lotte grinder for 2 mins at 23° C. (room temperature). Wet fractioning was then carried out as described.

Inventive example C was produced from dispersion A in a 3-step process: 1) Freezing of 1 kg of dispersion A in a 1 l plastic container at −18° C. for 48 h and thawing at room temperature for 24 h. 2) Filtration of the obtained coarse particle slurry of a white polymer crumb in water, thereby obtaining a solid material with a water content of ca. 20 weight-%. 3) Milling of the wet polymer crumbs using a GEFU 89210 Flotte Lotte grinder for 2 mins at 23° C. (room temperature). Wet fractioning was then carried out as described.

Inventive example D was produced from dispersion A in a 3-step process: 1) Freezing of 1 kg of dispersion A in a 1 l plastic container at −18° C. for 48 h and thawing at room temperature for 24 h. 2) Filtration of the obtained suspension of a white polymer crumb in water, thereby obtaining a solid material with a water content of ca. 13%. 3) Milling of the wet polymer crumbs using a GEFU 89210 Flotte Lotte grinder for 2 mins at 23° C. (room temperature). Wet fractioning was then carried out as described.

Example E was produced from dispersion A as follows: 1) Freezing of 210 kg of dispersion A in a 220 L polypropylene drum at −18° C. for 14 days and thawing at 25° C. for 14 days. 2) Filtration and drying of the obtained coarse particle slurry of a white polymer crumb in water was done in an industrial scale multipurpose vessel with a volume of ca. 300 L. The vessel was loaded with a total of 125 kg wet material. After the free flowing water was removed by filtration, achieving a residual water content about ca. 30 weight-%, a pressure of 20-30 mbar at a 30° C. mantle temperature of the vessel was applied. After drying to a water content of ca. 0.5% the polymer material was removed from the vessel and submitted to a dry sieving analysis.

Inventive example F was produced in a similar fashion as example E. After filtration of the obtained 125 kg sample of a coarse particle slurry of a white polymer crumb in water to a water content of ca. 30 weight-%, 20-30 mbar vacuum was applied at a 30° C. mantle temperature of the vessel while additionally stirring the material at an average agitation speed of 7-20 rpm for 24 h. The geometry of the stirrer was such that it did not mainly shear the polymer as the stirrer is situated 2 cm away from the wall of vessel but moved it against itself (paddle agitator type 316L). After drying to a water content of ca. 0.5% the polymer material was removed from the vessel and submitted to a dry sieving analysis.

Reference example G was obtained from reference sample A4 by sieving with a 4 mm and 1 mm sieve for 10 min. The weight % of the material fraction between 4 mm and 1 mm was then used as a starting distribution for the comparative examples H and I.

Comparative example H used the material produced in reference example G. The dry polymer crumbs were milled using a GEFU 89210 Flotte Lotte grinder for 2 mins. Dry fractioning was then carried out as described.

Comparative example I used the material produced in reference example G. Additionally, the dried polymer particles were re-wetted by suspending in water (volume ratio 1/1) for 5 mins followed by milling of the re-wetted polymer crumbs using a GEFU 89210 Flotte Lotte grinder for 2 mins at 23° C. (room temperature). Wet fractioning was then carried out as described.

Inventive example J used the frozen material produced in reference example A1 without thawing. The frozen polymer/water slurry was cut into 3 cm cubes with a saw. Ca. 300 g were milled using a high shear Thermomix Kitchen Machine (TM5) for 1 min at Level 10. Wet fractioning was then carried out as described.

Comparative example K used the material produced in reference example G. The dry polymer crumbs were milled using a high shear Thermomix Kitchen Machine (TM5) for 1 min at Level 10 at 23° C. (room temperature). Dry fractioning was then carried out as described.

Material L was a fine powder obtained from inventive example B by sieve fractioning for 10 min to yield a sieve fraction between with a 250 µm and 100 µm.

Comparative example M was a fine powder obtained from state of the art cryogrinding (liquid nitrogen cooling in a pen-mill) of A4 and subsequent sieve fractioning for 10 min to yield a sieve fraction between 250 µm and 100 µm.

Both material fractions L and M were then used for a) microscopic analysis and b) for analysis of flow characteristics.

Methods

The room temperature (RT) was 23° C. Unless noted otherwise, all percentages are weight percentages based on the total weight.

Grinding/milling of ca 200 g (calculated as dry) of material was done using a food mill "GEFU 89210 Flotte Lotte" with a 1 mm punch disk. The grinding was done manually for 2 minutes at 10-15 rpm while each 30 seconds the material deposited on the edge was returned back to the bottom to ensure homogenous milling of the material. After 1 min 50 sec the residual material was flushed with 500 ml of deionized water and then milled for 10 sec. "filtrate" and "retentate" were then recombined.

High shear grinding/milling of ca. 150 g material (calculated as dry) was carried out in a Thermomix kitchen machine TM5 of frozen dispersion A (frozen at −18° C. for 48 h) for 1 minute at level 10, resulting in crushed and still frozen polymer particles. The received particles were defrosted with 500 ml of deionized water and then wet fractioned as described below.

Sieving analysis was carried out on a Haver & Boecker test sieve shaker using stacked analysis sieves with the following mesh sizes: 4 mm, 1 mm, 500 µm, 250 µm and 100 µm. Sieving was carried out at room temperature for 10 minutes at an amplitude of 1.

Wet fractioning was carried out as follows: A water spray nozzle was placed on top of the 4 mm sieve, with the 1 mm, 500 µm, 250 µm and 100 µm sieves assembled below. The rinsing is carried out until the liquid, which is discharged through the receiver is clear (ca. 7 L). All wet fractions were dried at 40° C. until their residual water content was <1 weight-%. Dry fractions were measured gravimetrically in weight-% based on the overall (dry) mass employed.

Scale-up experiments (example E+F) were carried out on a multi-purpose vacuum filtration unit model (HV Drucknutsche V260-FA03) comprising a 300 L vessel. The vessel was equipped with a paddle agitator type 316L. Thawed material was used throughout the experiments. For filtration/draining of excess water, the vessel was loaded and overlayed with nitrogen at 3 bar for 1 h to remove free flowing water through a 0.1 mm mesh sieve. The solid content after draining was determined as ca. 70 weight-%.

For example E the material was dried by applying a vacuum of 20-30 mbar at 30° C.

In case of example F the material was instead stirred for 24 h at a temperature that did not exceed 35° C. at 20 rpm (revolutions per minute).

Residual water content was measured using a "loss of mass" method. It was done using a HE73 Moisture Analyzer (Mettler Toledo) at 125° C. with a stop criteria of 1 mg/75 s.

TABLE 1

Polymer powder after sieving analysis

| | References | | | | Inventive examples |
|---|---|---|---|---|---|
| No. | A1 | A2 | A3 | A4 | B |
| Description | frozen, thawed | frozen, thawed, drained | frozen, thawed, drained, partly dried | frozen, thawed, drained, dried | A1 with additional wet grinding |
| Residual water content | 50 weight % | 20 weight % | 13 weight % | <0.5 weight % | 50 weight % |
| Grinding | no | no | no | no | 2 min, 10-15 rpm in GEFU 89210 Flotte Lotte |
| Percentage > 1 mm | 66.6% | 66.6% | 63.4% | 72.3% | 15.9% |
| Percentage < 1 mm | 33.4% | 33.4% | 36.8% | 27.7% | 84.1% |

TABLE 1-continued

| Polymer powder after sieving analysis | | | | | |
|---|---|---|---|---|---|
| Ratio < 1 mm fraction to > 1 mm fraction | 0.50 | 0.50 | 0.58 | 0.38 | 5.29 |

| | Inventive examples | | Reference | Inventive example | Reference |
|---|---|---|---|---|---|
| No. | C | D | E | F | G |
| Description | A2 with additional wet grinding | A3 with additional wet grinding | Scale up; frozen, thawed, drained, dried | Scale up; frozen, thawed, drained, wet grinding | Composition of sieving fraction 4 mm sieve-1 mm sieve obtained from A4 |
| Residual water content | 20 weight % | 13 weight % | <0.5 weight % | 30 weight % | <0.5 weight % |
| Grinding | 2 min, 10-15 rpm in GEFU 89210 Flotte Lotte | 2 min, 10-15 rpm in GEFU 89210 Flotte Lotte | no | 20 rpm for 24 h in 300 l vessel with paddle agitator | no |
| Percentage > 1 mm | 20.1% | 18.3% | 65.9% | 19.7% | 97.1% |
| Percentage < 1 mm | 79.9% | 81.7% | 34.1% | 80.3% | 2.9% |
| Ratio < 1 mm fraction to > 1 mm fraction | 3.97 | 4.46 | 0.52 | 4.08 | 0.03 |

| | Comparative examples | | Inventive Example | Comparative example |
|---|---|---|---|---|
| No. | H | I | J | K |
| Description | G with additional dry grinding in GEFU 89210 Flotte Lotte | G with additional re-wetting and grinding in GEFU 89210 Flotte Lotte | A1 frozen with wet grinding in Thermomix | G with additional dry grinding in Thermomix |
| Residual water content | <0.5 weight % | ca. 50 volume % | 50 weight % | <0.5 weight % |
| Grinding | 2 min, 10-15 rpm | 2 min, 10-15 rpm | 2 min, Level 10 | 2 min, Level 10 |
| Percentage > 1 mm | 94.5% | 93.8% | 2.2 | 96.2 |
| Percentage < 1 mm | 5.5% | 6.2% | 97.8 | 3.8 |
| Ratio < 1 mm fraction to > 1 mm fraction | 0.06 | 0.07 | 44.45 | 0.04 |

From the reference examples A1, A2, A3 and A4 it can be seen that the process of freezing and thawing of the respective polyurethane dispersions (average particle size of dispersion <1 μm) leads to an agglomeration of particles. For evaluation, the sieving results were distributed into the share of polymer particles with sizes above and below 1 mm. The ratio of the distribution (<1 mm/>1 mm) of polymer crumbs in A1 without any mechanical stress/grinding is approximately 0.5. From the results indicated in reference example A2, A3 and A4 it can be seen that neither upon filtration/draining of free flowing water (20 weight-% residual water), partly drying the samples (ca. 13 weight-% residual water) nor drying the samples (ca. 0.5 weight-% residual water) the size distribution changed significantly. Example A4 shows a slight shift towards lager agglomerates which can be associated to some fusing of particles during the vacuum drying that leads to some agglomeration. Surprisingly, after only 2 minutes of grinding the frozen and thawed material (example B) as well as for the drained and partly dried material (examples C, D), the size distribution was changed significantly. The amount of particles having a size of <1 mm was more than doubled. The ratio (<1 mm/>1 mm) increased from <0.6 to >3.5.

In another setup the material was processed at industrial scale to demonstrate the scalability of the process. Again, reference E shows the size distribution of the material without any grinding steps. The size distribution is comparable to the results obtained at lab scale. Alternatively the material in example F was stirred at 20 rpm for 24 h which again led to a significant shift in size distribution towards smaller particles.

The following experiments were carried out as comparative examples: Firstly, a 4 mm-1 mm fraction was generated from the reference example A4 by sieving for 1 min. By analytically sieving for 10 mins and by evaluation sample G still contained a minor amount (2,9%) of particles <1 mm.

Example H was prepared by grinding sample G in GEFU 89210 Flotte Lotte for 2 mins. Surprisingly, the results after sieving analysis did not show a shift towards smaller particles. Instead, the size distribution remained comparable to example G.

This shows that the dried polymer itself is stable in size and could not be ground further at the given low stress conditions. In experiment I sample G was dispersed 5 minutes in a same volume of water in order to investigate if re-wetting allows one to obtain a size reduction of the polymer particles as in the original wet state. However, after grinding this composition it becomes obvious from the size distribution that again no shift towards smaller sizes was obtained as it stayed comparable to the reference G.

In order to show that grinding of reference A1 even in a frozen state (<0° C.) (no thawing took place) is possible, the material was exposed to high shear forces using a Thermomix kitchen machine. (example J).

The result clearly shows a significant reduction in particle size as the ratio (<1 mm/>1 mm) increased from <0.6 to >40.

To further demonstrate that the high shear forces alone are not suitable for grinding the dried material, example K was conducted. Here G was ground with the high shear Thermomix kitchen machine (2 min, level 10), no increased ratio was observed.

To further prove the viability of the process for applications that usually require expensive and energy intensive cryogenic milling to achieve powders <1 mm as needed for applications e.g. powder scattering or laser sintering, the fractions of samples A1, B, E, F, J were investigated in depth. For the mentioned applications, particle sizes below 500 μm are desired. Sizes below 150 μm are most wanted.

TABLE 2 detailed analysis of the respective sieving fractions

| Sieving assembly mm//sample No | Mean mesh size α mm | A1* | B | E* | F | J |
|---|---|---|---|---|---|---|
| >4 | 4 | 3.9% | 0.0% | 1.9% | 0.0% | 0.2% |
| 4-1 | 2.5 | 62.8% | 15.9% | 64.1% | 19.7% | 2.0% |
| 1-0.5 | 0.75 | 21.7% | 44.4% | 21.8% | 15.6% | 22.8% |
| 0.5-0.25 | 0.375 | 11.6% | 22.4% | 8.3% | 6.5% | 37.0% |
| 0.25-0.1 | 0.175 | 0.0% | 14.4% | 4.0% | 14.9% | 21.2% |
| <0.1 | 0.1 | 0.0% | 3.0% | 0.0% | 43.3% | 16.7% |
| Weighted mass mean size (mm) | | 1.93 | 0.84 | 1.88 | 0.70 | 0.42 |

*Reference or comparative example

Comparing the reference A1 to example B it can be seen that A1 does not contain fractions <250 μm and only about 12% of particles are smaller than the given threshold of 500 μm. On the contrary, example B contains 22% of the desired particles between 500 μm-250 μm. Additionally, about 15% of particles below 250 μm size could be generated. A small fraction of particles of <100 μm was also obtained.

The scale up examples show a similar trend. Also in the reference E about 12% of particles are below 500 μm in size. The distribution is comparable to A1. In example F a significant shift towards lower particle sizes was observed. A main fraction of 43%<100 μm could be generated by low energy stirring, thus making it a highly interesting alternative compared to cryogenic grinding. Further, grinding with high shear in the frozen state (example J) about 75% of the particles are in the desired range of <500 μm with 16.7% even lower than 100 μm.

The mass mean size further indicates the reduction in particle sizes as the mean of the A1 and E are more than halved in their respective counter parts B, F and J.

Mass mean size was calculated as $$\frac{\sum w\,\% * \alpha}{\sum w\,\%}$$

Figure 2:
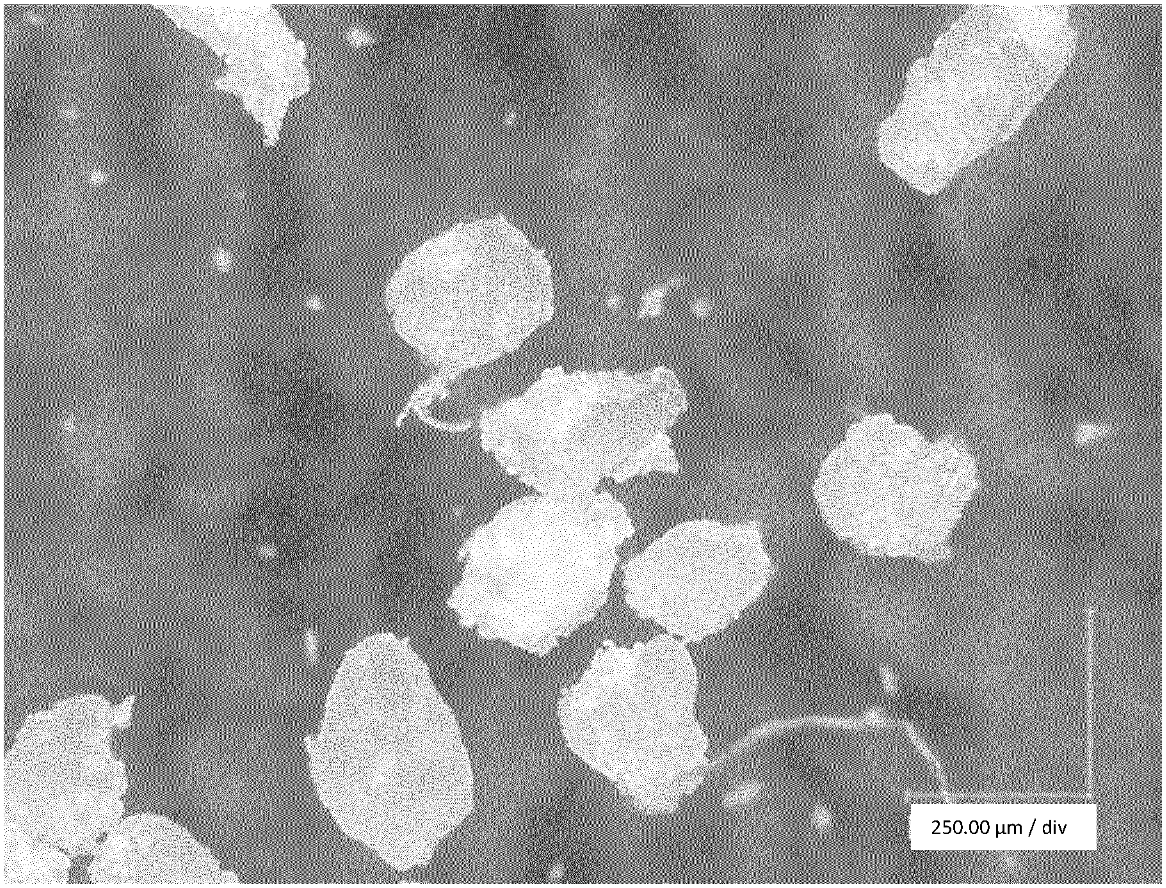
FIG. 2 shows a microscopy image of the particles of sample L which were prepared according to the inventive process.

To further assess the shape of the fine powders samples from cryogrinding (M) and wet grinding (L) with a comparable size distribution achieved by analytical sieving both samples with a 250 μm and 100 μm sieve was compared by light microscopy. The Microscope was a Keyence VHX used with a top-light light source. Sample was scattered on a transparent glass slide. Zoom was 200x. FIG. 1 shows a microscopy image of the cryogenic ground particles according to sample M. FIG. 2 shows a microscopy image of the particles of sample L which were prepared according to the inventive process. The images shown in FIGS. 1 and 2 clearly depict a difference in particle shape as the cryoground particles rather show distinct edges from breaking apart compared to a more round and less distinct shape when prepared according to the inventive process.

To further assess the properties of the inventive examples shown, samples L and M were compared in their flow behavior. Analysis was carried out on a powder analyzer (Revolution Powder Analyzer, PS Prozesstechnik GmbH) with the settings shown in Table 3.

TABLE 3

Settings of powder analyzer

| Settings Revolution Powder Analyzer | | |
|---|---|---|
| Rotation Rate | 0.5-10 | rpm |
| Imaging Rate | 10 | FPS |
| Preparation Time | 60 | s |
| Avalanche Threshold | 0.65 | % |
| Stop after | 60 | Avalanches |

Samples were characterized according to the following properties obtained from the Powder Analyzer:

Rotation Rate (RPM): The rotation rate is the revolutions per minute of the drum during the analysis. The user set this rate when the flowability method was created.

Avalanche Angle (degrees): The software collects the angle of the powder at the maximum power prior to the start of the power avalanche occurrence. This measurement is the average value for all the avalanche angles.

Avalanche Energy (cch, mj or pascal): The avalanche energy is the amount of energy released by an avalanche in the sample powder.

Break Energy (mJ): The break energy is the maximum energy level of the sample powder before an avalanche begins.

Surface Fractal: The surface fractal is the fractal dimension of the surface of the powder and provides an indication of how rough the powder surface is.

Density ($g/cm^3$): For every digital image taken, the software measures the density of the sample.

TABLE 4

Comparison of samples L and M as obtained from Powder Analyzer

| | | Inventive sample L | Comparative sample M |
|---|---|---|---|
| Sample description | | fine powder obtained from B by analytical sieve fractioning | fine powder obtained by analytical sieve fractioning from cryo-ground A4 material |
| Sieve fraction | µm | 100-250 | 100-250 |
| Rotation Rate | rpm | 0.5 | 0.5 |
| Avalanche Angle | deg | 53.9 | 56.8 |
| Avalanche Energy | mJ/kg | 27.7 | 28.8 |
| break energy | mJ/kg | 68.6 | 72.3 |
| Break Energy Abs | mJ/kg | 319.1 | 319.9 |
| surface fractal | | 2.2 | 2.25 |
| flow speed | mm/s | 129 | 146 |
| dynamic density | g/cm$^3$ | 0.479 | 0.456 |
| Rotation Rate | rpm | 2 | 2 |
| Avalanche Angle | deg | 54.5 | 54.3 |
| Avalanche Energy | mJ/kg | 20.4 | 19.8 |
| break energy | mJ/kg | 64.7 | 67.1 |
| Break Energy Abs | mJ/kg | 315.3 | 316.3 |
| surface fractal | | 1.97 | 2.1 |
| flow speed | mm/s | 175 | 200 |
| dynamic density | g/cm$^3$ | 0.478 | 0.46 |
| Rotation Rate | rpm | 4 | 4 |
| Avalanche Angle | deg | 51.2 | 52.6 |
| Avalanche Energy | mJ/kg | 14.2 | 14.5 |
| break energy | mJ/kg | 62.7 | 65.7 |
| Break Energy Abs | mJ/kg | 313.7 | 315.2 |
| surface fractal | | 1.88 | 2.1 |
| flow speed | mm/s | 162 | 178 |
| dynamic density | g/cm$^3$ | 0.476 | 0.457 |
| Rotation Rate | rpm | 6 | 6 |
| Avalanche Angle | deg | 50.3 | 53.4 |
| Avalanche Energy | mJ/kg | 11.6 | 13.3 |
| break energy | mJ/kg | 61.5 | 66.1 |
| Break Energy Abs | mJ/kg | 313.4 | 317.8 |
| surface fractal | | 1.91 | 2.14 |
| flow speed | mm/s | 170 | 148 |
| dynamic density | g/cm$^3$ | 0.473 | 0.452 |
| Rotation Rate | rpm | 8 | 8 |
| Avalanche Angle | deg | 53.2 | 52.9 |
| Avalanche Energy | mJ/kg | 8.4 | 12.6 |
| break energy | mJ/kg | 60.8 | 65.9 |
| Break Energy Abs | mJ/kg | 312.7 | 319 |
| surface fractal | | 1.98 | 2.16 |
| flow speed | mm/s | 159 | 211 |
| dynamic density | g/cm$^3$ | 0.474 | 0.45 |
| Rotation Rate | rpm | 10 | 10 |
| Avalanche Angle | deg | 53.8 | 54 |
| Avalanche Energy | mJ/kg | 7.5 | 11.2 |
| break energy | mJ/kg | 61.7 | 66.6 |
| Break Energy Abs | mJ/kg | 314.2 | 320.3 |
| surface fractal | | 2.06 | 2.25 |
| flow speed | mm/s | 178 | 222 |
| dynamic density | g/cm$^3$ | 0.472 | 0.448 |

The results depicted in Table 4 indicate that the inventive example L yield powder qualities with good flowability very much comparable to state-of-the-art cryo-ground powders.

Surprisingly, at all rotational speeds the wet-ground Sample L shows even lower break energy (preferred) and a lower surface fractal (preferred) compared to sample M.

The invention claimed is:

1. A method of manufacturing a particulate composition comprising:

I) providing an aqueous dispersion, the dispersion comprising polymer particles, wherein the polymer of the particles has a glass transition temperature as determined by differential scanning calorimetry according to ISO 11357, second heating, at a heating and cooling rate of 20 K/min;

II) storing the dispersion of step I) at a temperature of ≤0° C. until a polymer-comprising precipitate is formed;

wherein the method further comprises:

III) grinding the precipitate of step II) at a temperature above the glass transition temperature of the polymer to obtain a particulate composition, wherein the precipitate subject to grinding has a water content of at least 5 wt.-%.

2. The method according to claim 1, wherein the method further comprises concentrating the polymer particles to 70 to 90 wt.-% of the precipitate and proceeding with step III).

3. The method according to claim 1, wherein the method further comprises:

IV) removing water from the particulate composition obtained after step III), thereby obtaining a dried particulate composition.

4. The method according to claim 3, wherein the dried particulate composition of step IV) has a water content of ≥0.05 wt.-% to ≤5 wt.-%, based on the total weight of the dried particulate composition.

5. The method according to claim 1, wherein step III) is carried out at a temperature of ≤0° C. and above the glass transition temperature of the polymer particles.

6. The method according to claim 1, wherein step III) is carried out at a temperature of >0° C. and above the glass transition temperature of the polymer particles.

7. The method according to claim 1, wherein the precipitate in step II) has a water content of ≥10 to ≤70 wt.-%.

8. The method according to claim 1, wherein the polymer particles comprise thermoplastic polymer particles.

9. The method according to claim 8, wherein the thermoplastic polymer particles are thermoplastic polyurethane particles.

10. The method according to claim 1, wherein the polymer of the polymeric particles in the aqueous dispersion of step I) has a number-average molecular weight Mn, determined by gel permeation chromatography against polystyrene standards with THE as eluent, of ≥10000 g/mol.

11. The method according to claim 1, wherein the aqueous dispersion of step I) has a polymer solids content of ≥10 weight-% to ≤60 weight-%, based on the total weight of the aqueous dispersion.

12. A particulate composition obtained by a method according to claim 1.

13. The particulate composition according to claim 12, wherein the content of particles having a size of less than 0.50 mm, as determined by fractional sieving, is in the range of from 20 wt.-% to 100 wt.-%, based on the total weight of the particles.

14. A method of preparing a coating or an adhesive comprising providing the particulate composition according to claim 13.

15. The method according to claim 1, wherein the glass transition temperature of the polymer of the particles is −70° C. to 0° C.

* * * * *